No. 634,629. Patented Oct. 10, 1899.
F. SCHICK.
SPECTACLES.
(Application filed July 31, 1899.)
(No Model.)
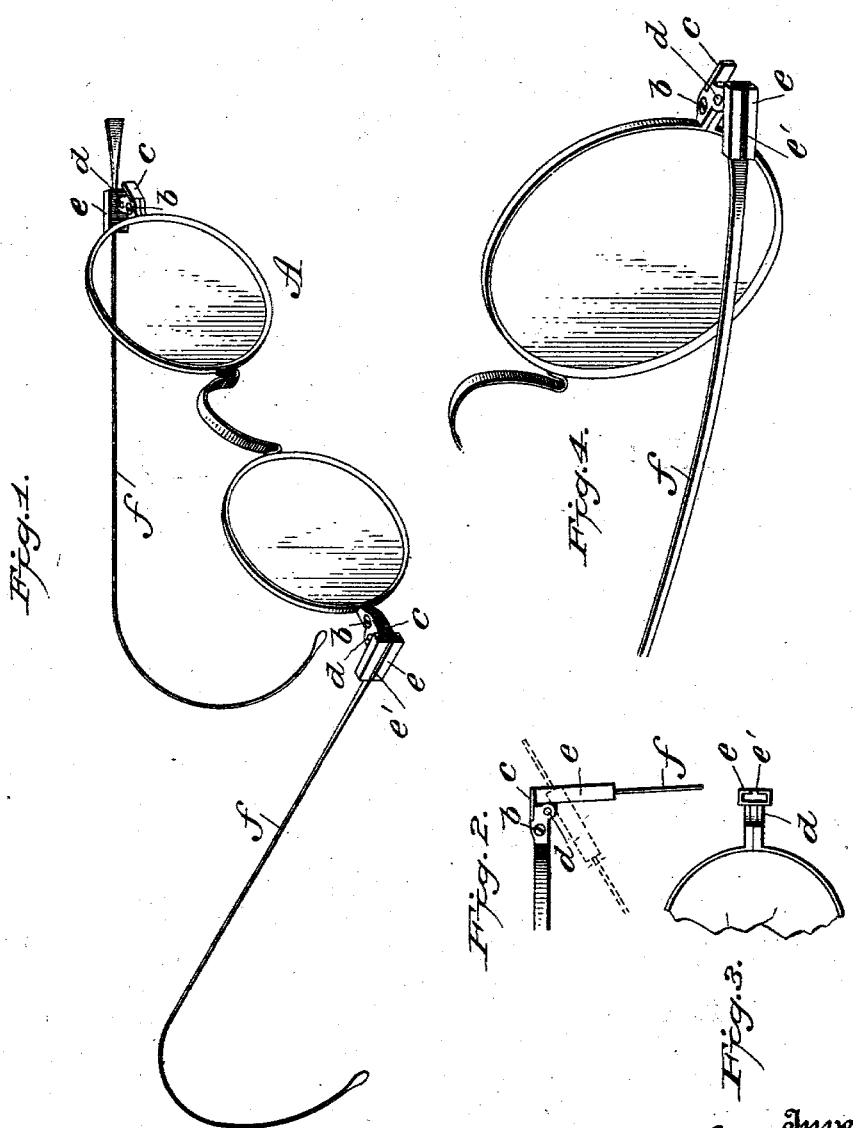
Witnesses
G. S. Elliott.
L. R. Elliott.
Inventor
Frank Schick
by Eugene W. Johnson
Attorney

UNITED STATES PATENT OFFICE.

FRANK SCHICK, OF ST. LOUIS, MISSOURI.

SPECTACLES.

SPECIFICATION forming part of Letters Patent No. 634,629, dated October 10, 1899.

Application filed July 31, 1899. Serial No. 725,564. (No model.)

*To all whom it may concern:*

Be it known that I, FRANK SCHICK, a citizen of the United States, residing at St. Louis, State of Missouri, have invented new and useful Improvements in Spectacles, of which the following is a specification.

This invention relates to improvements in spectacle-frames, the object being to provide spectacles with a removable bow or temple, so that said parts can be readily removed when broken or otherwise injured.

In the accompanying drawings, which illustrate my invention, Figure 1 is a perspective view showing my improvement applied to a spectacle-frame. Fig. 2 is a fragmentary plan view. Fig. 3 is a rear elevation of part of the spectacle-frame with the temple or bow removed, and Fig. 4 is a fragmentary perspective view showing a different style of bow or temple applied to the spectacle-frame.

A refers to the spectacle-frame, the rims thereof which hold the lenses in place being joined at the outer edges by a hinge in the usual manner, and one of the side pieces of the rims, which are connected to each other by screws $b$, has a plate or stop $c$, which projects beyond the pintle $d$, and in engagement with said pintle is the other member $e$ of the hinge, which is constructed to present a hollow member or box, which has a longitudinal slot $e'$ through the outer or exterior wall thereof. The interior of this hollow box or slotted leaf $e$ tapers longitudinally, and the stop or plate $c$ is adapted to abut against the end nearest the pintle to limit its swinging movement and provide a closure for one end.

$f$ refers to the bow or temple, which is constructed in the usual manner at one end, the other end being flattened or widened to provide a wedge-shaped or tapered portion, which is adapted to fit within the hollow member of the leaf and frictionally engage therewith to form the connecting means between the parts. With this form of joint either a wire temple, as shown in Fig. 1, may be used or a flat temple, as shown in Fig. 4.

When a wire temple is used, the body portion thereof can be readily passed through the slot in order to place its tapered end in engagement with the slotted leaf of the hinge, and the stop-plate will limit the swinging movement and close the wider end of said leaf. When a temple, as shown in Fig. 4, is used, one end is passed through the hollow leaf. By this arrangement either style of temple may be used with a spectacle-frame.

Having thus described my invention, what I claim as new, and desire to secure by Letters Patent, is—

1. In combination with a spectacle-frame, a hinged section having a tapered opening therethrough and a slit through one of the side walls thereof, of a temple having a flattened and tapered end for engagement with the hollow section, a portion of the temple being of less thickness than the width of the slit whereby the temple may be removed laterally from the hinge-section.

2. In a spectacle-frame a hinge-joint one of the parts having attached thereto a stop-plate the other part comprising a socket which has therethrough a longitudinally-tapered opening which socket is pivoted to the part having the stop-plate, of a temple one end of which is tapered and flattened to fit within the hollow socket, the parts being organized so that the end of the socket and the wider end of the temple may engage with the stop-plate, substantially as shown.

3. A spectacle-temple having a flattened and tapered end, in combination with a hinged leaf constructed to present an open-ended socket to receive one end of the temple, said leaf also having a side opening by means of which the temple may be removed laterally from the hinged leaf.

In testimony whereof I have hereunto set my hand in presence of two subscribing witnesses.

FRANK SCHICK.

Witnesses:
C. RABENSTEINER,
CHRIST. HOFFMANN.